Feb. 4, 1964

A. F. VAN ZEE 3,120,433

METHOD OF JOINING GLASS COMPONENTS BY RADIANT ENERGY

Filed Feb. 5, 1960

INVENTOR.
ARTHUR F. VAN ZEE

BY

ATTORNEYS

# United States Patent Office 3,120,433
Patented Feb. 4, 1964

3,120,433
METHOD OF JOINING GLASS COMPONENTS BY RADIANT ENERGY
Arthur F. Van Zee, Toledo, Ohio, assignor to Owens-Illinois Glass Company, a corporation of Ohio
Filed Feb. 5, 1960, Ser. No. 6,906
6 Claims. (Cl. 65—43)

This invention relates to a method of heating glass by means of radiant energy. More particularly the present invention relates to an improved method for heating glass parts and the sealing or solder glass employed to bond the parts together.

It is customary when bonding glass parts together to place a sealing or solder glass in a paste condition on the sealing edges of said parts, or to have previously dipped the said parts into a molten bath of solder glass leaving a layer of solder glass fused onto the edges to be sealed, position the sealing edges in abutting arrangement, and then heat the glass parts and solder glass strongly until the solder glass and glass parts are fused together into an integral unit. However, it has been observed that in normal heating of these glass parts and solder glass by means of flames or a hot gas, the glass parts frequently crack due to thermal stresses. A study of this problem has disclosed that the heat is transferred from the hot flames or gas to the outside surface of the glass parts and solder glass by means of convection. The heat then passes from the outside of the glass to the interior by conduction. Since glass is a poor thermal conductor, high temperature gradients occur between the inner and outer glass walls which produce high stresses within the glass and especially tension on the inside surface which in turn give rise to glass breakage.

It is therefore an object of this invention to provide a method of heating applicable to bonding glass parts together by means of a solder glass in which high stresses in the glass parts are avoided. It is also an object of this invention to provide a method of heating of general application to glass whereby temperature gradients and stresses are reduced therein. It is a further object of this invention to provide a method of applying heat in the course of bonding glass parts together by means of a solder glass in which the temperature gradient within the glass parts and the solder glass is minimized. It is a still further object of this invention to provide a novel process of heating during the bonding of glass parts to-. gether by means of a solder glass to form a seal which is applicable to the formation of either a vitrified or a devitrified glass seal. These and other objects will be apparent from the description which follows.

The novel process of this invention comprises forming glass seals between glass parts by means of a solder glass in which the heat needed for effecting the necessary fusion is radiant energy from a high temperature source which will emit a large fraction of the thermal energy at short wave lengths whereby an internal heating of the glass parts occurs. More specifically this invention contemplates the use of infrared energy from a light source whose temperature is at least 2000° F., and which emits infrared radiation having wave lengths of maximum intensity preferably from about 1.0 to 2.1 microns in length. In addition the invention contemplates that the glass parts being sealed together are partially transparent to the infrared radiation of the aforementioned wave lengths.

The nature of the present invention will be described in greater detail with reference to the accompanying graphs in which FIGURE 1 is a self explanatory graph which sets forth the degree of transmission of infrared radiation by a representative base glass (B) of varying thickness.

In each of the above figures the transmission in percent is set forth on the vertical axis and the wave length of the infrared radiation in microns is set forth on the horizontal axis.

Figure 1:
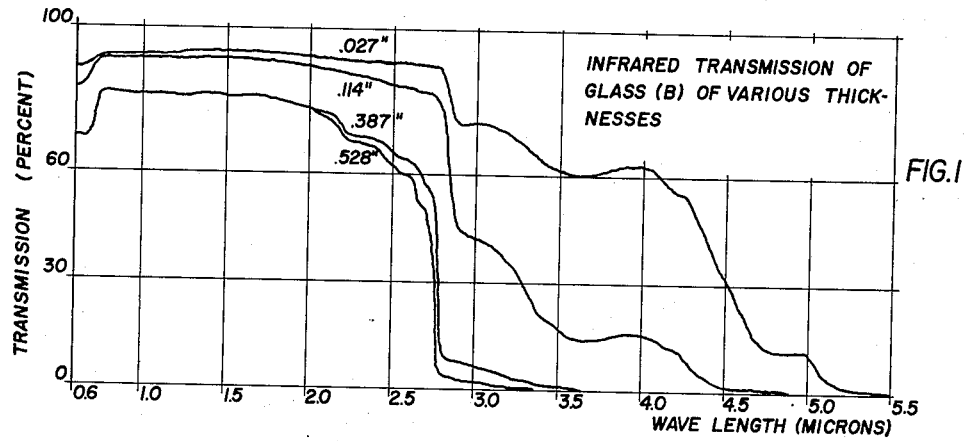
Figure 2:
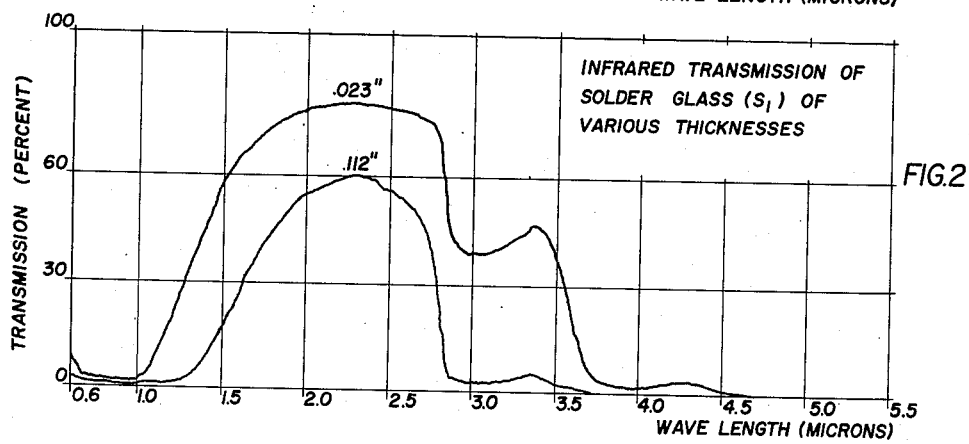
FIGURE 2 is similar to FIGURE 1 except the glass is a solder glass ($S_1$).
Figure 3:
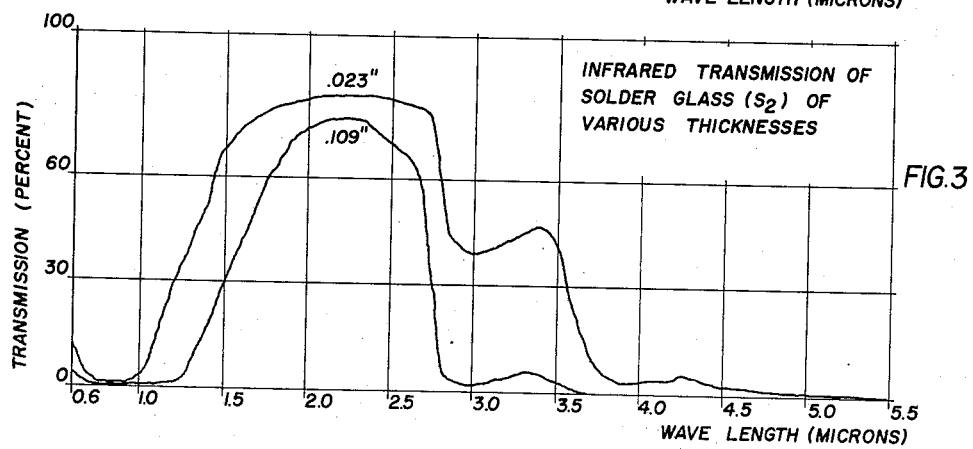
FIGURE 3 is similar to FIGURE 2 but relates to another solder glass ($S_2$).

The present invention is predicated in part upon the observation that most glasses are partially transparent to certain infrared radiant energy. Moreover, it has been noted that part of this radiation will penetrate through some thickness of glass and then will be absorbed in subsequent layers of the glass. The net result is that the glass undergoing heating obtains a more uniform heating and as a consequence temperature gradients in the glass are reduced. To show that part of the radiant energy will penetrate through some thickness of glass and then be absorbed in subsequent layers thereby giving off thermal energy at different levels in the glass, infrared transmission curves for the representative base glass, designated as B, are set forth in FIGURE 1. The thicknesses of glass are for 0.027 inch, 0.114 inch, 0.387 inch, and 0.528 inch. These curves show conclusively that each succeeding thicker piece of glass absorbs radiation which was passed by a thinner piece of glass. That this phenomenon is also true of solder glasses, designated as $S_1$ and $S_2$, is shown by FIGURES 2 and 3.

By way of illustration the face plate and funnel of a 22 inch television tube can be bonded together by a sealing glass which may be applied as a thick paste to the edges of the face plate and funnel to be joined together as is well known in the art. The solder glass may also be applied to the face and the funnel to be joined by dipping the edges of either face or funnel or the edges of both into a trough of molten solder glass as taught in Patent No. 2,822,777. The necessary heat energy is supplied from a source of radiant heat such as a Sylvania range bulb (Part No. 27785) having a Vycor envelope with a filament therein as found in one type of Sears-Roebuck electric range (Model No. 101.947550) or an infrared quartz tube lamp with a filament therein as made by General Electric, designated as type T-3, and currently available in lengths from 5 to 50 inches. In each case the radiation from the heat source is filtered, i.e. through Vycor in one instance and quartz in the other. The envelope which can be Vycor, quartz, or some other similar transparent material not only protects the filament from damage due to gases in the atmosphere but also serves to filter out the radiation having wave lengths longer than 2.7 microns. This wave length radiation is undesirable because it heats the surface of the glass article which is nearest the heat source producing excessive temperature gradients and thereby causing undue stress in the glass article being sealed.

It is to be noted that the heat is applied externally to the solder glass paste, funnel and face plate in assembled relationship for joining together. It is also to be noted that the infrared source from which the necessary heat is derived need not be applied separately to the parts prior to their being sealed together as is commonly practiced in the art. Accordingly the present invention is particularly advantageous where one desires to reopen sealed composite glass articles, such as television tubes for reprocessing, where the heat of necessity must be applied from only one side.

The base glass B referred to in the disclosure has the following analysis in percent by weight.

Principal components:

| | |
|---|---|
| $SiO_2$ | 64.41 |
| $Al_2O_3$ | 4.27 |
| CaO | 1.05 |
| BaO | 10.61 |
| $Na_2O$ | 8.08 |
| $K_2O$ | 10.04 |

Miscellaneous components:

| | |
|---|---|
| MgO | 0.96 |
| $Sb_2O_3$ | 0.18 |
| $As_2O_3$ | 0.14 |
| MnO | 0.10 |
| $Co_3O_4$ | 0.00065 |
| NiO | 0.0035 |
| $F_2$ | 0.27 |
| PbO | 0–6.5 |
| NaF | 0–2.0 |

Figure 4:
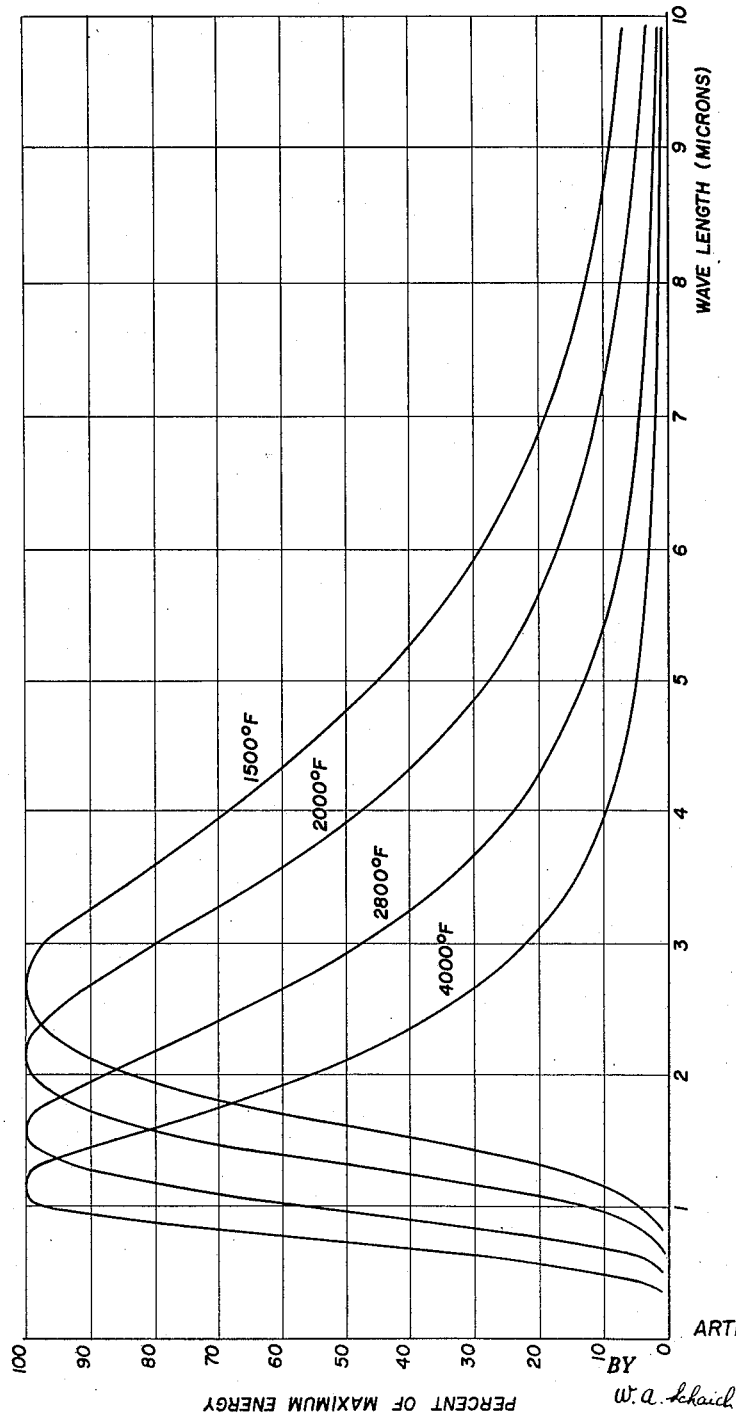
FIGURE 4 is a self-explanatory graph showing radiant energy distributions for a black body according to Planck's law at four different elevated temperatures. In addition the peak of each curve in FIGURE 4 represents that wave length of infrared radiation which is of maximum intensity.

In general the best bonds between the sealing glass and the base glass of the face plate and funnel are obtained when the filament, which may be a metal or non-metal, of the infrared bulb heater is maintained at a temperature of at least 2000° F. and preferably a minimum of 2200° F. The best internal heating of the glass occurs when the filament of the heat lamp is at about 4000° F. At this temperature the distribution of energy according to Planck's law,[1] see FIGURE 4, is such that 83 percent of the energy is released at wave lengths shorter than 3.0 microns. FIGURES 1–3 indicate that the glasses are partially transparent to radiation shorter than 3.0 microns. A filament temperature in the heat lamp of about 4000° F. resulted in the lowest temperature gradient and produced the best seals with a minimum of strain therein. However, satisfactory results were obtained when the temperature of the filament in the heat lamp is about 2800° F. The area under this curve of FIGURE 4 indicates that for this filament temperature, 69 percent of the heat will be released at wave lengths shorter than 3.0 microns where the glasses are partially transparent. In fact some reduction in the temperature gradient was noticeable when the temperature was as low as 2000° F. This temperature gives the wave length of maximum intensity at 2.1 microns. The area under this curve of FIGURE 4 shows that 50 percent of the energy is released at wave lengths shorter than 3.0 microns. It will also be apparent from FIGURE 1 that over 60 percent infrared transmission occurs with even the thickest glasses if the wave length is less than 2.5 microns for the wave length ranges set forth.

Numerous other glasses including base glasses of the following chemical analysis can be employed as the glass which is being bonded together by the solder glass:

[1] For a discussion of Planck's law including Wien's displacement law and the Stefan-Boltzmann law relating to heat radiation, see p. 59 et seq. of Heat Transmission (third edition) by W. H. McAdams, McGraw-Hill Book Co., New York, 1954.

| | Percent |
|---|---|
| $SiO_2$ | 64.0–68.4 |
| $Al_2O_3$ | 1.6–4.3 |
| CaO | 0.2–2.0 |
| BaO | 7.0–10.66 |
| $Na_2O$ | 6.0–8.1 |
| $K_2O$ | 6.4–10.5 |
| Misc. components | 1.5–10.0 |

The solder glasses referred to in the disclosure have the following analysis in percent by weight:

| Component | $S_1$ | $S_2$ |
|---|---|---|
| PbO | 71 | 71.0 |
| $B_2O_3$ | 17 | 15.5 |
| ZnO | 9 | 9.5 |
| CuO | 3 | 2.0 |
| $SiO_2$ | | 2.0 |

The above sealing glasses are merely by way of illustration and numerous other sealing and base glasses can be used providing (1) they are reasonably compatible each other with respect to thermal expansion and (2) are not completely transparent to infrared radiant energy. Moreover, the sealing glasses can be either the vitreous or devitrifiable type. In fact the present invention is applicable to any glass which is not entirely transparent to infrared radiation. For example, an extremely pure fused silica glass which was completely transparent to infrared radiations would not be contemplated by this invention. However, an impure fused silica glass would be included in the general inventive concept disclosed herein.

Although the present invention has been described primarily in terms of effecting a joining together of base glasses by a solder glass, it is to be understood that the novel heating process of this invention is of general utility and applicable to any glass heating situation in which it is desired to heat the glass so as to produce the minimum temperature gradient within the glass being heated thereby reducing strains therein. By way of example the novel infrared heating process of this invention might well be used in annealing and tempering processes for the purpose of minimizing strain in glasses undergoing heat treatment. In addition the sealing glass may be applied to the glass components being joined together in a manner other than those described above. For example, the sealing glass can be previously applied to the edges of the glass components by firing a ground frit onto the edges of the components. It will be apparent to one skilled in the art that the sealing glass can be applied in still other ways to one or both of the glass components at their edges.

According to the provisions of the patent statutes, I have explained the principle of my invention and have described what I consider its preferred embodiment. However, I desire to have it understood that within the scope of the appended claims, the invention may be practiced otherwise than as specifically described.

What is claimed is:

1. In a method of joining at least two glass components at their edges with a solder glass by heat fusing said solder glass between said two glass components, the steps comprising applying solder glass to the edges, placing the components in abutting position for sealing together and thereafter heating said glass edges and said solder glass by exposing them to radiant energy emanating from a source which is at a temperature of at least 2000° F., which gives off infra-red radiation having a wave length of maximum intensity ranging from about 1.0 to 2.1 microns, and which radiates at least fifty percent of the energy at wave lengths shorter than 3.0 microns thereby releasing heat internally within said glass edges and said solder glass and heat fusing said solder glass to form a seal, the glass of said components and the solder glass being only partially transparent to said defined radiation.

2. The method of claim 1 in which the temperature of the radiant energy source is about 2000° F., the wave length of maximum intensity is about 2.1 microns, and about fifty percent of the total energy is at wave lengths shorter than 3.0 microns.

3. The method of claim 1 in which the temperature of the radiant energy source is about 2200° F., the wave length of maximum intensity is less than 2.0 microns, and about fifty-six percent of the energy is at wave lengths shorter than 3.0 microns.

4. The method of claim 1 in which the temperature of the radiant energy source is about 2800° F., the wave length of maximum intensity is about 1.6 microns, and about sixty-nine percent of the energy is at wave lengths shorter than 3.0 microns.

5. The method of claim 1 in which the temperature of the radiant energy source is about 4000° F., the wave length of maximum intensity is about 1.2 microns, and about eighty-three percent of the energy is at wave lengths shorter than 3.0 microns.

6. In a method of joining at least two glass components at their edges with a solder glass by heat fusing said solder glass between said two glass components, the steps comprising applying solder glass to the edges, placing the components in abutting position for sealing together and thereafter heating said glass edges and said solder glass by exposing them to radiant energy emanating from a source which is at a temperature of at least 2800° F., which gives off infra-red radiation having a wave length of maximum intensity ranging from about 1.0 to 1.6 microns, and which radiates at least fifty percent of the energy at wave lengths shorter than 3.0 microns, thereby releasing heat internally within said glass edges and said solder glass and heat fusing said solder glass to form a seal, the glass of said components and the solder glass being only partially transparent to said defined radiation.

References Cited in the file of this patent
UNITED STATES PATENTS

| | | |
|---|---|---|
| 2,078,356 | Wilson | Apr. 27, 1937 |
| 2,332,099 | McKinnis | Oct. 19, 1943 |
| 2,377,849 | Brinkert et al. | June 12, 1945 |
| 2,402,631 | Hull | June 25, 1946 |
| 2,416,392 | Hood | Feb. 25, 1947 |
| 2,559,249 | Hudson | July 3, 1951 |
| 2,658,984 | Mohn | Nov. 10, 1953 |
| 2,669,068 | Wambreuze | Feb. 16, 1954 |
| 2,749,668 | Chaffotte et al. | June 12, 1956 |
| 2,814,100 | Lippman | Nov. 26, 1957 |
| 2,859,368 | Biggs et al. | Nov. 4, 1958 |